United States Patent [19]

Butt

[11] 4,450,903

[45] May 29, 1984

[54] PLATE TYPE HEAT EXCHANGER WITH TRANSVERSE HOLLOW SLOTTED BAR

[75] Inventor: Alan G. Butt, La Crosse, Wis.

[73] Assignee: The Trane Company, La Crosse, Wis.

[21] Appl. No.: 419,680

[22] Filed: Sep. 20, 1982

[51] Int. Cl.³ ............................................... F28F 3/00
[52] U.S. Cl. .................................... 165/110; 165/166; 165/174
[58] Field of Search ................. 165/110, 166, 167, 174

[56] References Cited

U.S. PATENT DOCUMENTS

| | | | |
|---|---|---|---|
| 3,559,722 | 2/1971 | Schauls et al. | 165/1 |
| 3,880,231 | 4/1975 | Gauthier | 165/166 |
| 3,895,676 | 7/1975 | Young | 165/167 |
| 4,249,595 | 2/1981 | Butt | 165/110 |

Primary Examiner—Sheldon J. Richter
Attorney, Agent, or Firm—Carl M. Lewis; Ronald M. Anderson; Raymond W. Campbell

[57] ABSTRACT

A plate type heat exchanger in which liquid is injected into a vaporous fluid stream through orifices in a hollow slotted bar. The hollow bar is disposed transversely to the longitudinal axis of the heat exchanger, between and abutting facing surfaces of two metallic sheets. Vaporous fluid is admitted and distributed across the width of the heat exchanger in a first passage defined by the two metallic sheets, and flows through channels formed in the hollow bar where it abuts the sheets. The vaporous and liquid fluids mix, and after passing in heat transfer relationship with another fluid flowing in a second passage defined by adjacent metallic sheets, exit the heat exchanger. Since the hollow bar extends between the metallic sheets, it provides an effective structural support, permitting the heat exchanger to be used at relatively high operating pressures. In addition, the relative size and number of channels and orifices formed in the hollow bar control the ratio of the rate of flow of liquid and vapor through the heat exchanger.

16 Claims, 9 Drawing Figures

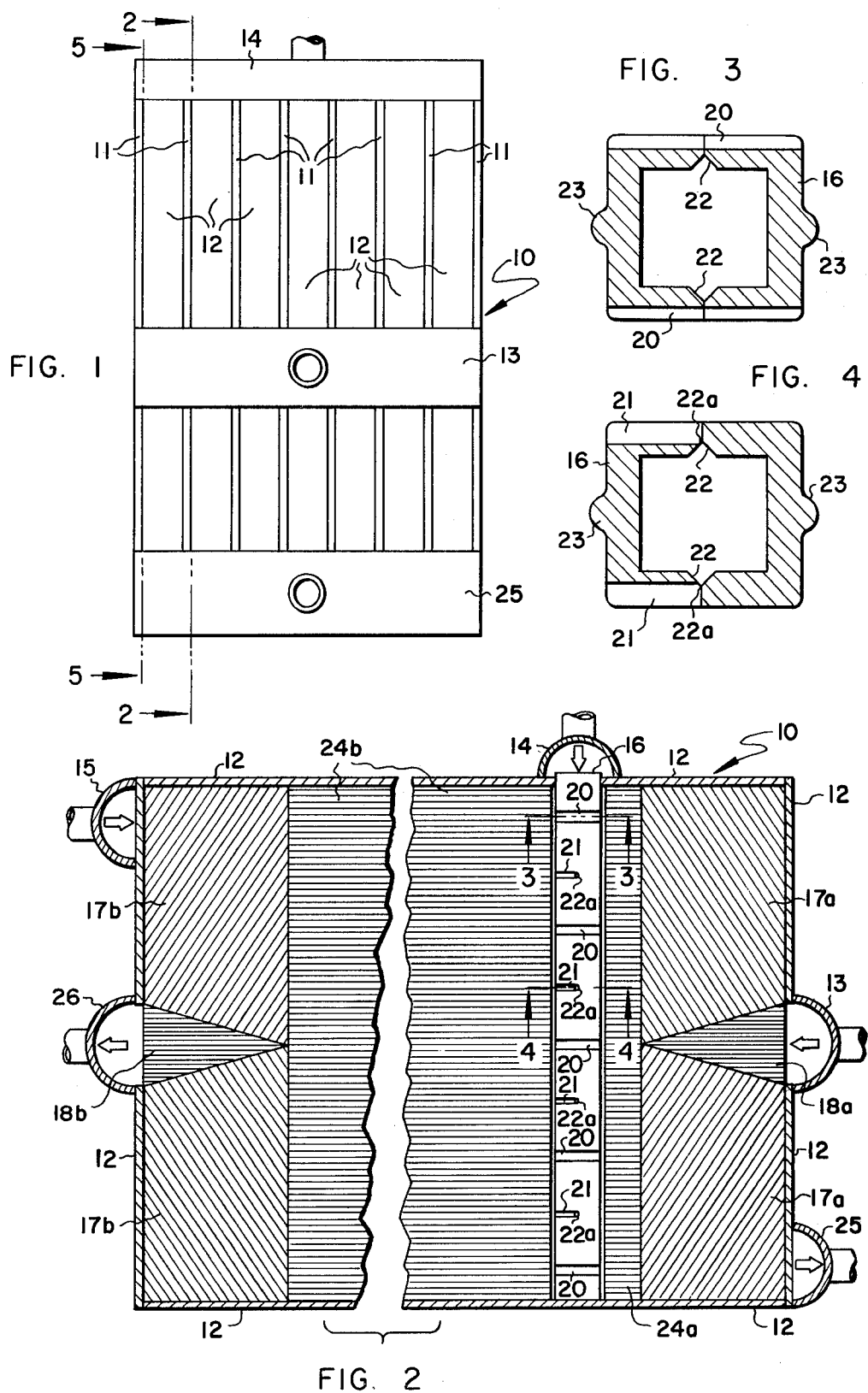

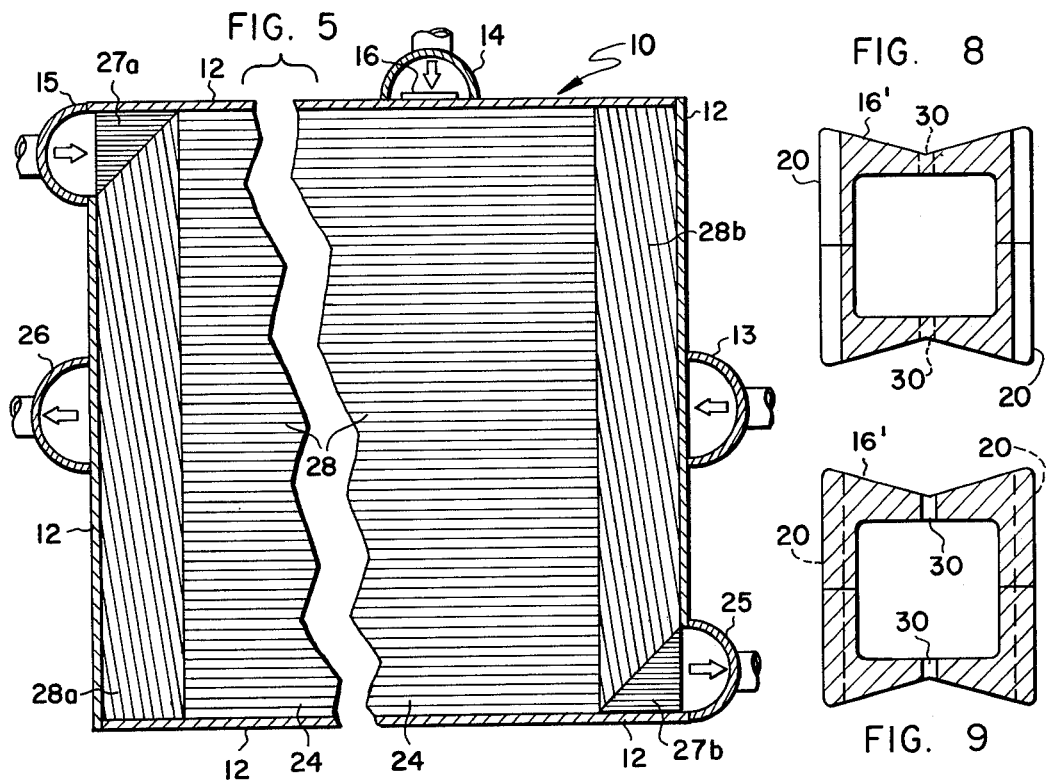
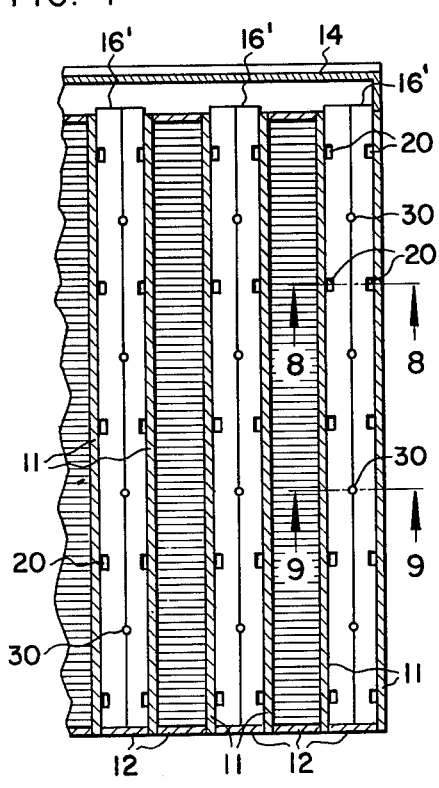
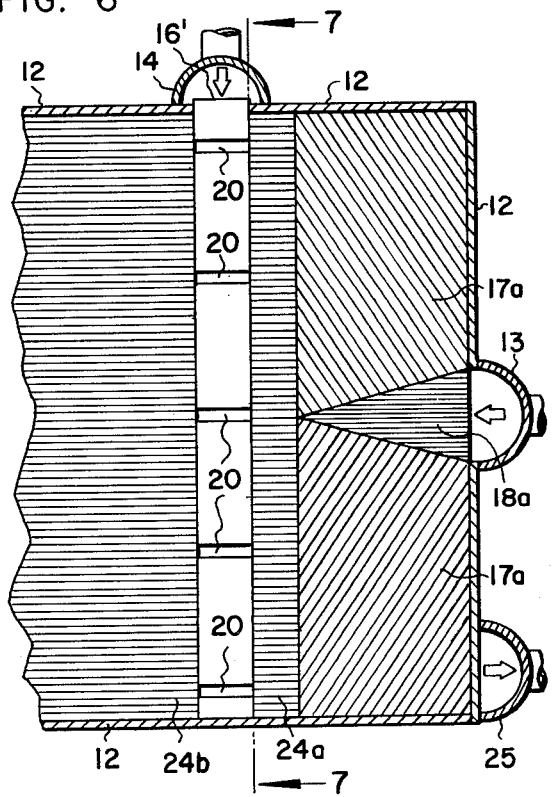

PLATE TYPE HEAT EXCHANGER WITH TRANSVERSE HOLLOW SLOTTED BAR

DESCRIPTION

TECHNICAL FIELD

This invention in general pertains to a plate type heat exchanger in which two fluids are combined to flow through a common passage between parting sheets in heat transfer relationship with a third fluid, and specifically concerns the use of a hollow bar for supporting the sheets and injecting one of the two fluids into the common passage.

BACKGROUND ART

Certain industrial applications require a heat exchanger to provide heat transfer between a mixed liquid and gas and a third fluid. For efficient operation and optimum heat transfer, the liquid and gas should be uniformly distributed as a mix in a common passage, before passing through the heat exchanger in heat transfer relationship with the third fluid. If the liquid and gas each enter the heat exchanger core separately through adjacent passages separated by a common sheet, a transverse slot in that sheet may provide a fluid path for the two fluids to mix. This type heat exchanger is disclosed in U.S. Pat. Nos. 3,559,722 and 4,249,595, both assigned to the same assignee as the present invention.

In the '722 patent, a split or slotted parting sheet separating the liquid and gas passages is suported by a corrugated sheet metal fin pad that "bridges" the slot. This abridging fin pad reinforces the structure where it is weakened by the slot in the metallic sheet.

To achieve a higher operating pressure rating and to provide means for controlling the flow of one of the two fluids, the '595 patent discloses the use of a slotted bar for supporting the metallic sheets, in place of the abridging fin pad. The slotted bar has a greater surface area brazed into supporting contact with the adjacent metallic sheets than would be possible with fin material having the maximum available fin density. The rated operating pressure of the resulting heat exchanger is in excess of 700 psi.

Sparge tubes are an alternative means of distributing and injecting a fluid into a passage to mix with another fluid. A sparge tube is a conduit having a plurality of spaced apart orifices disposed along its length, extending transversely across the width of a fluid passage between two sheets. Liquid (or a gas) is injected at one or both ends of the conduit and flows out through the orifices to mix with the other fluid flowing through the passage around the sparge tube. Examples of this and alternative uses for a sparge tube in a heat exchanger are shown in U.S. Pat. No. 3,895,676. The sparge tube heat exchanger typically is used for two phase fluid applications of moderate flow rate, where the ASME rated pressure ranges from less than 250 psi to about 700 psi.

A sparge tube positioned between two sheets may tend to vibrate as fluid flows between its exterior surface and the facing surfaces of the adjacent sheets. Such fluid flow induced motion or fluttering of the tube may result in early fatigue failure. Because the tube is not normally brazed in place or even mounted in contact with both sheets, it does not provide significant support, and thus creates a gap or weakness in the heat exchanger structural matrix. This is a limiting factor in the pressure rating of a heat exchanger built with a sparge tube.

It is therefore an object of this invention to provide a plate type heat exchanger with means for separately distributing a first fluid and a second fluid, and mixing them within a common passage.

A further object of this invention is to support the adjacent sheets of the heat exchanger where the two fluids mix so that the resulting structure may withstand relatively high operating pressures.

A still further object of this invention is to control the rate of flow of the two fluids through the heat exchanger prior to their mixing in the common passage.

Yet a still further object is to inject one of the two fluids using means not subject to vibration and fatigue failure, which may be brazed in place.

These and other objects of the invention will become apparent from the following description of the preferred embodiments and by reference to the accompanying drawings.

DISCLOSURE OF THE INVENTION

The subject invention is a plate type heat exchanger which includes three or more generally planar metallic sheets of similar size and shape, arranged in spaced-apart, parallel relationship. The sheets are connected at their periphery by bar means, and in conjunction with the bar means, define separate first and second passages. There are included means for admitting a first fluid into the first passages and for distributing it substantially across the width of the heat exchanger. A hollow metallic bar is disposed within and transversely across the first passage, and has two substantially flat, parallel surfaces that abut and support the metallic sheets that define the first passage.

A plurality of channels are disposed transversely across at least one of the flat surfaces of the hollow metallic bar. The hollow bar also includes a plurality of orifices spaced apart along its length, providing fluid communication between the first passage and the interior of the bar. At one end of the hollow bar are inlet means for admitting a second fluid into the interior of the bar. The first fluid passes through the transverse channels in the hollow bar and mixes with the second fluid as it flows through the orifices. Manifold means are provided for collecting and conveying the mixed first and second fluids out of the heat exchanger.

The heat exchanger further includes means for admitting a third fluid into the second passage and for distributing the third fluid substantially across the width of the heat exchanger. After the third fluid trasverses at least part of the heat exchanger in heat transfer relationship with the mixed first and second fluids, manifold means are operative to collect and convey the third fluid out of the second passage in the heat exchanger.

BRIEF DESCRIPTION OF THE DRAWINGS

FIG. 1 is an elevational view showing one end of the subject plate type heat exchanger.

FIG. 2 is a cross-sectional view taken along section line 2—2 of FIG. 1.

FIG. 3 is a cross-sectional view of the hollow bar, taken along section line 3—3 of FIG. 2.

FIG. 4 is a cross-sectional view of the hollow bar taken along section line 4—4 of FIG. 2.

FIG. 5 is a cross-sectional view of the heat exchanger taken along section line 5—5 of FIG. 1.

FIG. 6 is a cross-sectional view of a second embodiment of the heat exchanger analogous to that shown in FIG. 2.

FIG. 7 is a partial cross section view taken along section lines 7—7 of FIG. 6.

FIG. 8 is a cross-sectional view of the hollow bar, second embodiment, taken along section line 8—8 of FIG. 7.

FIG. 9 is a cross-sectional view of the second embodiment of the hollow bar, taken along section line 9—9 of FIG. 7.

DESCRIPTION OF THE PREFERRED EMBODIMENTS

With reference to FIG. 1, a plate type heat exchanger incorporating the present invention is generally denoted by reference numeral 10. Heat exchanger 10 is constructed of flat metallic sheets 11, of similar shape, length, and width, spaced apart in parallel relationship and sealed at the edges with sealing bars 12. Heat exchanger 10 is normally oriented with a first header 13 disposed on its bottom end, with a longitudinal axis oriented vertically, i.e., with the end shown in FIG. 1 facing downward. A second header 14 would thus be disposed along one side, and a third header 15 at the top of heat exchanger 10.

Turning now to FIGS. 2–5, a first embodiment of heat exchanger 10 is shown in greater detail, by the use of cross-sectional views. For example, FIG. 2 discloses the interior construction of a typical first passage in which a first and a second fluid are admitted, distributed, and mixed to flow through heat exchanger 10. Throughout the following explanation, for purposes of convenience, the first heat exchange fluid will be referred to simply as vapor, and the second fluid as liquid. It should be understood however, that the flow path of liquid and vapor through the heat exchanger may be interchanged within the scope of the claims. A third fluid flows through second passages in heat exchanger 10 as shown in the cross-sectional view of FIG. 5. In the preferred embodiments, first and second passages alternate in order across the width of the heat exchanger, with a first passage always "sandwiched" between two second passages. Thus, if the letter "A" represents a first passage, and the letter "B" a second passage, the order is BABA . . . AB. In the alternative, the order might be: BABBABBA . . . BBAB.

Vapor is admitted to the first passage from header 13 through an inlet defined by the sealing bars 12 at a point where the header 13 is sealingly attached thereto in surrounding relationship. The vapor is distributed by means comprising two sections of corrugated metallic fin sheet material 17a, having a trapezoidal shape, and a triangular-shaped section of corrugated fin sheet material 18a. The flow of the vapor is generally directed parallel to the crests of corrugated metallic fin sheet sections 17a and 18a so that it is uniformly distributed across the width of heat exchanger 10 within the first passage. Immediately downstream of fin sheets 17a is a short section of corrugated fin sheet material 24a arranged with the crests of the fins running parallel to the longitudinal axis of the heat exchanger. A spacer rib 23, on hollow metallic bar 16 abuts the downstream end of corrugated fin sheets 24a, and similarly a second spacer rib 23 formed on the opposite surface of hollow bar 16 abuts a substantially longer section of corrugated fin sheet material 24b that also runs parallel to the longitudinal axis of the heat exchanger 10.

Hollow bar 16 serves several functions in heat exchanger 10. First, it provides structural support between adjacent metallic sheets 11, the facing surfaces of which define the first passage; secondly, hollow bar 16 provides means for introducing a liquid into the core of heat exchanger 10 and mixing it with the vapor; and third, bar 16 includes means for controlling the flow of vapor and liquid through heat exchanger 10 in a predetermined ratio, as explained below.

As shown in FIGS. 3 and 4, hollow bar 16 includes a plurality of spaced apart channels 20 formed on its surfaces which abut the adjoining metallic sheets 11. These channels 20 provide means for the vapor which enters first header 13 to pass through the first passage, beyond the obstruction otherwise presented by hollow bar 16. A plurality of second channels 21 are also formed in the surfaces of hollow bars 16 which abut the adjoining metallic sheets 11, but extend only part way across these parallel surfaces of bars 16. Channels 21 have a greater depth so that they intersect grooves 22 which run lengthwise along the inner surfaces of bars 16, adjacent the surfaces in which channels 21 are formed. The intersection of each groove 22 with one of the channels 21 defines an orifice 22a.

Liquid enters heat exchanger 10 through second header 14 that is sealingly attached to sealing bars 12 in surrounding relationship to the ends of hollow bars 16 that extend from each of the first passages. The liquid thereafter flows through the hollow interior of bars 16, and into the first passage through orifices 22a and channels 21. As the liquid flows through orifices 22a, it experiences a significant pressure drop, and may at that point partly flash into a vapor. The vapor and liquid mix in the first passage, and the mixture passes through corrugated metallic fin sheet section 24b and is collected at the opposite end of heat exchanger 10 by corrugated fin sheet sections 17b and 18b. Corrugated fin sheets 17b and 18b are similar in shape to fin sheets 17a and 18a, respectively, and the crests of the fins are aligned to collect the mixed liquid and vapor as it exits corrugated fin sheet 24b. The two phase fluid thereafter exits the heat exchanger through a second collector manifold 26 which is sealingly attached in surrounding relationship to sealing bars 12 adjacent corrugated fin sheet 18b.

As shown in FIGS. 1, 5, the second passage is defined through the heat exchanger 10 between facing surfaces of adjacent metallic sheets 11, and by sealing bars 12. A third fluid, either vapor, liquid, or a mixture thereof (typically a vapor) enters through third header 15 which is sealingly attached to sealing bars 12 adjacent a triangular-shaped corrugated fin sheet 27a. Corrugated fin sheet 27a and an adjoining trapezoidal-shaped corrugated fin sheet 28a comprise means for distributing the third fluid across the width of the heat exchanger. The third fluid passes through corrugated fin sheet 28 of heat exchanger 10 in counterflow direction to the mixed liquid and vapor, and in heat transfer relationship therewith. Subsequently, the third fluid is collected by corrugated fin sheets 28b and 27b and exits heat exchanger 10 through a first collector 25 which is sealingly attached to sealing bars 12 adjacent corrugated fin sheet 27b.

FIGS. 6–9 show a second embodiment of the subject invention substantially the same as the first, except with regard to the structure of hollow bar 16. In the second embodiment, the hollow bar is represented by reference numeral 16' and includes channels 20 across the parallel faces which abut facing metallic sheets 11 just as hollow bar 16; however, it does not include channels 21, spacer ribs 23, nor grooves 22. Instead, bar 16' is shaped so that the upstream and downstream facing sides are concave, and it includes a plurality of orifices 30 in spaced apart relationship along its length, centered in these concave surfaces.

As already explained with regard to the first embodiment of bars 16, vapor enters the heat exchanger first passage through first header 13, is distributed by corrugated fin sheets 18a and 17a, passes through fin sheet 24a and through channels 20 in hollow bars 16'. Liquid enters through a second header 14 and flows through the interior of hollow bars 16' across the width of the heat exchanger 10. The liquid subsequently flows out the orifices 30 to mix with the vapor in corrugated fin sheets 24a and 24b and flows through the heat exchanger 10 in heat transfer relationship with the third fluid. The mixed liquid and vapor are collected by corrugated fin sheets 17b and 18b and exit through second collector manifold 26. The flow of the third fluid through heat exchanger 10 incorporating hollow bars 16' is as previously described, and as shown in FIG. 5.

The relative cross-sectional area of channels 20 and orifices 22a, or channels 20 and orifices 30 determines the ratio of vapor-to-liquid flow through heat exchanger 10. The design pressure drop for the liquid and vapor in the system will determine the size of channels 20 and orifices 22a or 30, and their spacing along the length of hollow bars 16 or 16'. Proper design of a heat exchanger incorporating the subject invention involves balancing the various parameters to provide proper flow of the vapor and liquid with adequate structural support so that the high pressure rating is not impaired. For example, the density and width of channels 20 along the length of hollow bars 16 or 16' should not be so great that their product exceeds 75% of the length of the bars, since that would leave less than 25% of the surface of hollow bars 16 or 16' to support the adjacent metallic sheets 11. Likewise, the depth of channels 20 is constrained by the cross-sectional area of the interior of bars 16 or 16'. To improve liquid flow volume, hollow bars 16 or 16' may be supplied liquid from both ends, through an additional header, similar to 14. Both liquid and vapor flow volume can be increased by stacking two or more hollow bars 16 or 16' within a single first passage, oriented with channels 20 parallel to the crest of corrugated fin sheets 24b.

It is anticipated that heat exchanger 10 would be constructed of aluminum sheets and extrusions or of other material having good transfer characteristics. The techniques for constructing a heat exchanger of this type using brazed aluminum are well known in the art and include assembling the sheets 11 and other components described above in a fixture, and brazing in a salt bath or vacuum furnace.

Hollow bars 16 or 16' are likely to comprise two "U"-shaped channels brazed together during the construction of heat exchanger 10, into the shape shown in FIGS. 3, 4, 8, and 9. The two channel sections comprising hollow bars 16 or 16' might be tack-welded together prior to the brazing process to insure their proper alignment. A more expensive approach would be to use a single hollow extrusion for bar 16 or 16'.

Various alternatives to the preferred embodiments disclosed herein will be apparent to those skilled in the art. For example, hollow bars 16' may include orifices 30 only on the downstream facing concave surface, rather than on both concave surfaces to minimize the risk of liquid flood-back during turn-down of the vapor. Second channels 21 may be extended across the width of hollow bar 16 similar to channels 20, so that both vapor from fin section 24a and liquid from orifices 22a flow through channels 21. It may also be desirable to operate the heat exchanger 10 with the third fluid in parallel or in cross flow relationship to the flow of the mixed liquid and vapor. If additional headers and collectors are provided, multiple fluids flowing through separate passages within heat exchangers 10 may replace the single third fluid in heat exchange relationship with the mixed liquid and vapor. These and other modifications are within the scope of the invention, which is defined in the claims which follow.

I claim:

1. A plate type heat exchanger comprising
   a. a plurality of generally planar metallic sheets arranged in spaced apart, parallel relationship;
   b. bar means for sealingly connecting the metallic sheets and in conjunction therewith defining a first passage between adjacent facing surfaces of two of the sheets;
   c. means for admitting and distributing a first fluid into the first passage;
   d. a hollow metallic bar disposed within and across the first passage, downstream of the means for admitting and distributing the first fluid, said hollow bar being of a size to extend between the facing surfaces of the metallic sheets defining the second passage in support thereof, and including a plurality of channels formed in at least one of the surfaces of the hollow metallic bar abutting one of the metallic sheets; said hollow bar further including a plurality of orifices spaced apart along is length, for providing fluid communication between its hollow interior and the first passage;
   e. inlet means for admitting a second fluid into the interior of the hollow bar, said second fluid flowing through the orifices to mix with the first fluid within the first passage;
   f. means for collecting and conveying the mixed first and second fluids out of the first passage after they have traversed at least a part of the heat exchanger.

2. The heat exchanger of claim 1 wherein the connecting bar means and the metallic plates together define a second passage between other adjacent facing surfaces of two of the sheets; said heat exchanger further comprising means for admitting and distributing a third fluid into the second passage, and means for collecting and conveying the third fluid out of the heat exchanger after it has passed in heat transfer relationship with the mixed first and second fluids, said first and second passages lying contiguous to each other.

3. A plate type heat exchanger comprising
   a. three or more generally planar metallic sheets of similar length and width, arranged in spaced apart, parallel relationship along a common longitudinal axis;
   b. bar means for sealingly connecting the metallic sheets along the periphery of their facing surfaces, and in conjunction with the metallic sheets defining a plurality of fluid passages between adjacent facing surfaces of the metallic sheets, including separate first and second passages;
   c. means for admitting a first fluid into the first passage and for distributing the first fluid substantially across the width of the heat exchanger;
   d. a hollow metallic bar disposed within and extending transversely across the first passage, said hollow bar having two substantially flat parallel surfaces that abut and support the metallic sheets which define the first passage, and including a plurality of channels disposed transversely across at least one of said flat surfaces, through which the first fluid may flow past the hollow bar, said hollow bar further including a plurality of orifices spaced apart along its length, said orifices providing fluid communication between the first passage and the interior of the hollow bar;

e. inlet means for admitting a second fluid into the interior of the hollow bar, said second fluid passing through the orifices to mix with the first fluid within the first fluid passage;

f. means for admitting a third fluid into the second passage and for distributing the third fluid substantially across the width of the heat exchanger;

g. means for collecting and conveying the mixed first and second fluids out of the first passage; and h. means for collecting and conveying the third fluid out of the second passage after that fluid has traversed at least a part of the heat exchanger in heat transfer relationship with the mixed first and second fluids.

4. A plate type heat exchanger comprising a. a first, second, and third generally planar metallic sheets of similar length and width, arranged in spaced apart, parallel relationship along a common longitudinal axis;

b. bar means for sealingly connecting the metallic sheets along the periphery of their facing surfaces, and in conjunction with the metallic sheets defining
   (i) a first passage between adjacent facing surfaces of the first and second metallic sheets;
   (ii) a second passage between other adjacent facing surfaces of the second and third metallic sheets, said second passage being separated from the first by the second metallic sheet in heat exchange relationship therewith;

c. means for admitting and distributing a first fluid into the first passage, said means including a first header;

d. an extruded hollow metallic bar disposed within and across the first passage downstream of the means for admitting and distributing the first fluid; said hollow bar having two substantially parallel surfaces, a length extending transversely across the heat exchanger between the bar means, and a thickness extending between the facing surfaces of the first and second metallic sheets in abutting support thereof, at least one surface of the hollow bar including a plurality of spaced apart channels formed therein adjacent the metallic plates; said hollow bar further including a plurality of spaced apart orifices providing fluid communication between its interior and the first passage;

e. inlet means for admitting a second fluid into the interior of the hollow bar, said second fluid flowing through the orifices to mix with the first fluid, said means including a second header;

f. means for admitting and distributing a third fluid into the second passage, said means including a third header;

g. means for collecting and conveying the third fluid out of the second passage after the third fluid has traversed the heat exchanger, said means including a first manifold;

h. means for collecting and conveying the mixed first and second fluids out of the first passage, after they have traversed at least a part of the heat exchanger in heat transfer relationship with the third fluid, said means including a second manifold.

5. The heat exchanger of claim 1, 3, or 4 wherein the channels are formed in both surfaces of the hollow bar that abut and support the adjacent facing surfaces of the metallic sheets.

6. The heat exchanger of claim 1, 3, or 4 wherein the orifices are disposed in the hollow bar intermediate the surfaces thereof that abut the metallic sheets, and are directed downstream relative to the flow of the first fluid through the first passage.

7. The heat exchanger of claim 6 wherein part of the orifices are also directed upstream relative to the flow of the first fluid through the first passage.

8. The heat exchanger of claim 1, 3, or 4 wherein the hollow bar comprises two generally "U" shaped extrusions brazed in place with their openings in opposing relationship.

9. The heat exchanger of claim 8 wherein the surfaces of the hollow bar which face generally upstream and downstream relative to the flow of the first fluid, include a spacer rib running along the length of the bar.

10. The heat exchanger of claim 8 wherein the surfaces of the hollow bar which face generally upstream and downstream relative to the flow of the first fluid are generally concave.

11. The heat exchanger of claim 1, 3, or 4 wherein the hollow bar includes a groove running lengthwise inside it, adjacent one of the surfaces that abut the metallic sheets.

12. The heat exchanger of claim 11 wherein some of the channels in the surface of the hollow bar are deeper than others, and said orifices are formed where the groove inside the hollow bar intersects these deeper channels.

13. The heat exchanger of claim 11 wherein the hollow bar further includes a plurality of channels that extend part way across the surface that abuts the metallic sheets adjacent the groove, and said channels are sufficiently deep to intersect the groove inside the hollow bar, thereby forming said orifices in the hollow bar.

14. The heat exchanger of claim 1, 3, or 4 wherein the cross-sectional area of the channels and of the orifices controls the relative rate of flow of the first and second fluids therethrough.

15. The heat exchanger of claim 14 wherein the first fluid is a gas and the second fluid is a liquid.

16. The heat exchanger of claim 1, 3, or 4 further comprising a plurality of hollow bars stacked in parallel alignment, extending transversely across the first passage.

* * * * *